(12) United States Patent
Nakamura et al.

(10) Patent No.: US 8,116,065 B2
(45) Date of Patent: Feb. 14, 2012

(54) DIELECTRIC CERAMIC MATERIAL AND MONOLITHIC CERAMIC CAPACITOR

(75) Inventors: Tomoyuki Nakamura, Moriyama (JP); Hironori Suzuki, Yasu (JP); Tomonori Muraki, Yasu (JP); Masayuki Ishihara, Yasu (JP); Makoto Matsuda, Moriyama (JP); Takehisa Sasabayashi, Echizen (JP); Akihiro Shiota, Yasu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 459 days.

(21) Appl. No.: 12/499,946

(22) Filed: Jul. 9, 2009

(65) Prior Publication Data

US 2010/0014210 A1    Jan. 21, 2010

(30) Foreign Application Priority Data

Jul. 18, 2008   (JP) .................. 2008-186813

(51) Int. Cl.
*H01G 4/06*      (2006.01)
*C04B 35/00*     (2006.01)

(52) U.S. Cl. ............ 361/311; 361/321.2; 501/138; 501/139

(58) Field of Classification Search ............ 361/311, 361/321.2; 501/138, 139
See application file for complete search history.

(56) References Cited

FOREIGN PATENT DOCUMENTS

| | | |
|---|---|---|
| JP | 2001-294481 A | 10/2001 |
| JP | 2008-088053 A | 4/2008 |
| WO | WO-2008-010412 | 1/2008 |

*Primary Examiner* — Eric Thomas
*Assistant Examiner* — Arun Ramaswamy
(74) *Attorney, Agent, or Firm* — Dickstein Shapiro LLP

(57) ABSTRACT

A dielectric ceramic material is composed of a perovskite compound represented by $ABO_3$ as a main component. In the case where $ABO_3$ is, for example, $BaTiO_3$, the crystal grains include $BaTiO_3$ crystal grains composed of the main component and, as secondary phases, Mg—Ni—Ti-containing crystalline grains composed of a crystalline oxide containing at least Mg, Ni, and Ti and Ba—Si-containing crystalline grains composed of a crystalline oxide containing at least Ba and Si.

20 Claims, 2 Drawing Sheets

Mg-Ni-Ti-O-BASED CRYSTALLINE OXIDE GRAIN: 12

$BaTiO_3$ CRYSTAL GRAIN: 11

Ba-Si-O-BASED CRYSTALLINE OXIDE GRAIN: 13

DIELECTRIC CERAMIC MATERIAL AND MONOLITHIC CERAMIC CAPACITOR

BACKGROUND OF THE INVENTION

1. Field of the Invention

The present invention relates to dielectric ceramic materials and monolithic ceramic capacitors, and in particular, to a dielectric ceramic material suitable for use in monolithic ceramic capacitors and monolithic ceramic capacitors including the dielectric ceramic material.

2. Description of the Related Art

A dielectric ceramic material of interest to the present invention is described in, for example, WO 2008/010412. The dielectric ceramic material described in WO 2008/010412 is mainly composed of a barium titanate-based complex oxide with a perovskite structure and contains secondary grains composed of an R—Ni—Ti—O-based crystalline complex oxide mainly containing a rare-earth element R, Ni, and Ti. The Ni may be partially substituted by Mg.

The foregoing dielectric ceramic material has high reliability such that problems do not occur even when a high field strength (e.g., about 20 kV/mm) is continuously applied to the dielectric ceramic material in a high temperature atmosphere for a long period of time. Thus, even when individual dielectric ceramic layers having smaller thickness are used to reduce the size and increase the capacity of a monolithic ceramic capacitor, the use of the dielectric ceramic material results in a high-reliability monolithic ceramic capacitor.

However, it was found that the foregoing dielectric ceramic material disadvantageously has a relatively low thermal shock resistance.

When a monolithic ceramic capacitor is mounted on a substrate by reflow soldering, the monolithic ceramic capacitor is in a heated condition for several minutes. Meanwhile, the melting point of solder has tended to increase with the trend toward lead-free solder. Thus, the monolithic ceramic capacitor is subjected to thermal shock, i.e., the monolithic ceramic capacitor is heated to as high as about 275° C. to about 325° C. during reflow soldering.

The thermal shock, i.e., a rapid temperature rise and rapid temperature drop, may cause cracks in the monolithic ceramic capacitor. Particularly in recent years, further progress toward a reduction in the thickness of layers to a very small thickness to less than about 1 μm, and to an increase in capacity, has increased the likelihood of cracks due to thermal shock.

SUMMARY OF THE INVENTION

Accordingly, it is an object of the present invention to provide a dielectric ceramic material capable of overcoming the foregoing problems and a monolithic ceramic capacitor including the dielectric ceramic material.

According to preferred embodiments of the present invention, a dielectric ceramic material includes crystal grains and grain boundaries and a composition having a perovskite compound represented by $ABO_3$ (wherein A includes Ba or Ba and at least one of Sr and Ca; and B includes Ti or Ti and at least one of Zr and Hf) as a main component. To overcome the foregoing technical problems, the dielectric ceramic material has the structure described below.

In the dielectric ceramic material according to preferred embodiments of the present invention, the crystal grains include an $ABO_3$-based crystal grain composed of the main component and, as secondary phases, a Mg—Ni—Ti-containing crystalline grain composed of a crystalline oxide containing at least Mg, Ni, and Ti and a Ba—Si-containing crystalline grain composed of a crystalline oxide containing at least Ba and Si.

The dielectric ceramic material according to preferred embodiments of the present invention may further contain, as auxiliary components, one or more of R (wherein R includes at least one of La, Ce, Pr, Nd, Sm, Eu, Gd, Tb, Dy, Ho, Er, Tm, Yb, Lu, and Y), M (M includes at least one of Mg, Ni, Mn, Co, Fe, Cr, Cu, Al, Mo, W, and V), and Si.

In this case, preferably, the total R content is in the range of about 0.1 to about 3.0 parts by mole with respect to about 100 parts by mole of the main component, and the total M content is in the range of about 0.2 to about 5.0 parts by mole with respect to about 100 parts by mole of the main component.

Furthermore, preferably, the main component $ABO_3$ has a Ba content of about 78 to about 100 mol %, a Sr content of about 0 to about 2 mol %, a Ca content of about 0 to about 20 mol %, a Ti content of about 96 to about 100 mol %, a Zr content of about 0 to about 2 mol %, and a Hf content of about 0 to about 2 mol %.

According to preferred embodiments of the present invention, a monolithic ceramic capacitor includes a capacitor main body having a plurality of stacked dielectric ceramic layers, a plurality of first internal electrodes, and a plurality of second internal electrodes, each of the first and second internal electrodes being arranged between dielectric ceramic layers and along specific interfaces of the dielectric ceramic layers, and a first external electrode and a second external electrode that are arranged on different portions of outer surfaces of the capacitor main body, in which the first internal electrodes are electrically connected to the first external electrode, the second internal electrodes are electrically connected to the second external electrode, and the first internal electrodes and the second internal electrodes are alternately arranged in the stacking direction.

In the monolithic ceramic capacitor according to preferred embodiments of the present invention, the dielectric ceramic layers are composed of the foregoing dielectric ceramic material according to preferred embodiments of the present invention.

In the monolithic ceramic capacitor according to preferred embodiments of the present invention, the first and second internal electrodes are mainly composed of Ni.

According to preferred embodiments of the present invention, it is possible to provide a dielectric ceramic material with excellent thermal shock resistance. Thus, a monolithic ceramic electronic component including the dielectric ceramic material according to preferred embodiments of the present invention has improved resistance to the effects of rapid temperature change when mounted.

Although the reason for improvement in resistance in preferred embodiments of the present invention is not clear, it is speculated that the presence of both of the Mg—Ni—Ti-containing crystalline grains and the Ba—Si-containing crystalline grains reduces thermal shock.

According to preferred embodiments of the present invention, when R, M, and Si are contained as auxiliary components, and where the total R content is in the range of about 0.1 to about 3.0 parts by mole with respect to about 100 parts by mole of the main component, and where the total M content is in the range of about 0.2 to about 5.0 parts by mole with respect to about 100 parts by mole of the main component, and where the total content of Si is about 0.2 parts by mole to about 4.0 parts by mol with respect to 100 parts by mole of the main component it is possible to enhance reliability under high-temperature loading conditions.

Furthermore, the main component ABO$_3$ with a Ba content of about 78 to about 100 mol %, a Sr content of about 0 to about 2 mol %, a Ca content of about 0 to about 20 mol %, a Ti content of about 96 to about 100 mol %, a Zr content of about 0 to about 2 mol %, and a Hf content of about 0 to about 2 mol % has a composition suitable for providing a high dielectric constant.

Other features, elements, characteristics and advantages of the present invention will become more apparent from the following detailed description of preferred embodiments of the present invention with reference to the attached drawings.

DESCRIPTION OF THE PREFERRED EMBODIMENTS

Figure 1:
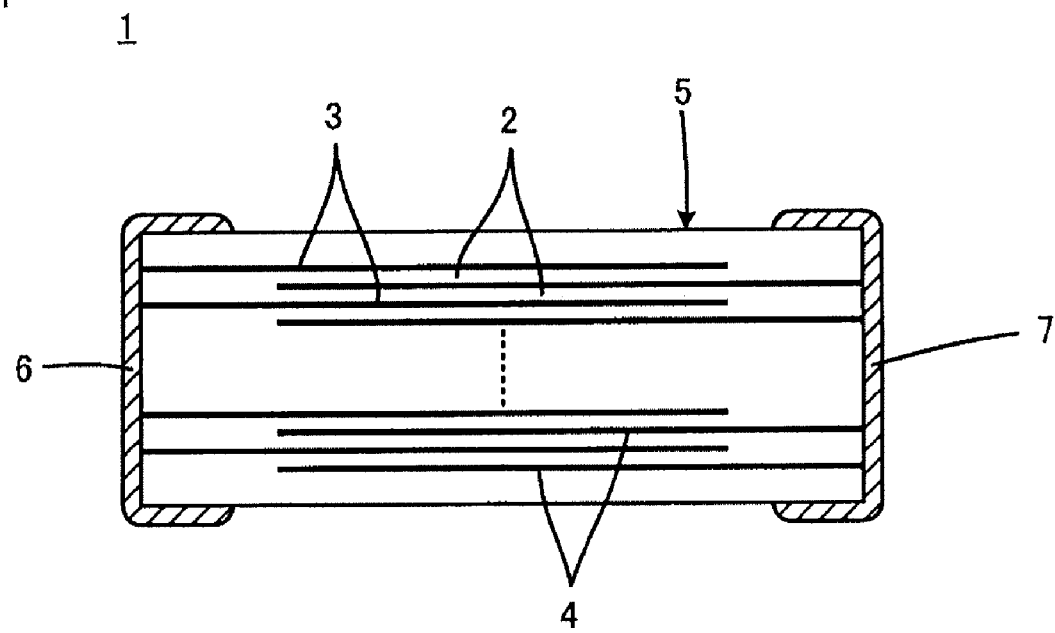
FIG. 1 is a cross-sectional view of a monolithic ceramic capacitor 1 including a dielectric ceramic material according to an embodiment of the present invention.

FIG. 1 is a cross-sectional view of a monolithic ceramic capacitor 1 including a dielectric ceramic material according to an embodiment of the present invention.

The monolithic ceramic capacitor 1 includes a main body 5 having a plurality of stacked dielectric ceramic layers 2, a plurality of first internal electrodes 31 and a plurality of internal electrodes 4, the first and second internal electrodes 3 and 4 being provided along specific interfaces of the dielectric ceramic layers 2. The main body 5 is provided with a first external electrode 6 and a second external electrode 7 that are arranged on different portions of outer surfaces of the main body 5. In the monolithic ceramic capacitor 1 shown in FIG. 1, the first and second external electrodes 6 and 7 are provided on respective end faces of the main body 5 opposite to each other. The first internal electrodes 3 are electrically connected to the first external electrode 6. The second internal electrodes 4 are electrically connected to the second external electrode 7. The first and second internal electrodes 3 and 4 are alternately arranged in the stacking direction. Preferably, the internal electrodes 3 and 4 are mainly composed of Ni.

In the monolithic ceramic capacitor 1, the dielectric ceramic layers 2 are composed of a dielectric ceramic material according to preferred embodiments of the present invention. The dielectric ceramic material according to preferred embodiments of the present invention includes crystal grains and grain boundaries and has the composition described below.

The composition contains a perovskite compound represented by ABO$_3$ (wherein A includes Ba or Ba and at least one of Sr and Ca; and B includes Ti or Ti and at least one of Zr and Hf) as a main component.

In the dielectric ceramic material, the crystal grains contain ABO$_3$-based crystal grains composed of the main component. The crystal grains further contain, as secondary phases, Mg—Ni—Ti-containing crystalline grains composed of a crystalline oxide containing at least Mg, Ni, and Ti and Ba—Si-containing crystalline grains composed of a crystalline oxide containing at least Ba and Si.

The dielectric ceramic material according to an embodiment of the present invention thus includes the crystal grains that contain two types of crystalline grains as the secondary phases: the Mg—Ni—Ti-containing crystalline grains and the Ba—Si-containing crystalline grains.

Figure 2:
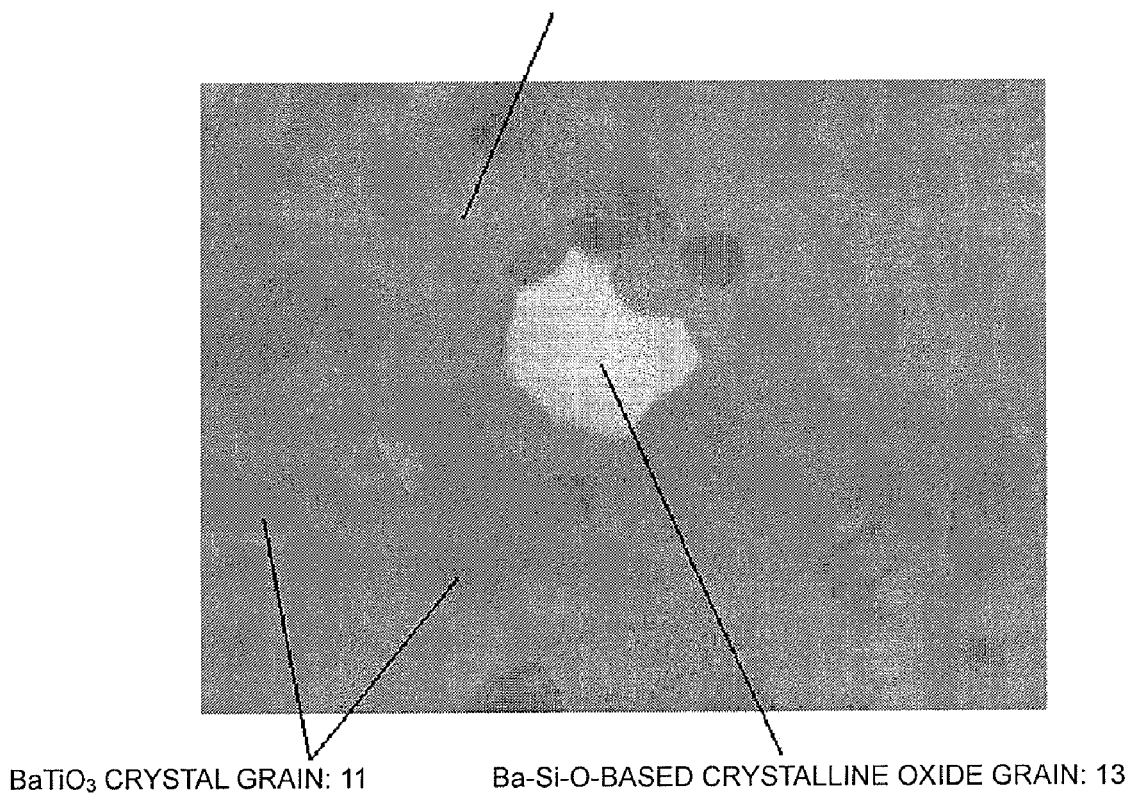
FIG. 2 shows the microstructure of crystal grains of a dielectric ceramic material according to an embodiment of the present invention.

FIG. 2 is a photograph showing the microstructure of crystal grains of a dielectric ceramic material according to an embodiment in which BaTiO$_3$ serving as ABO$_3$, a Mg—Ni—Ti—O-based crystalline oxide serving as a crystalline oxide containing at least Mg, Ni, and Ti, and a Ba—Si—O-based crystalline oxide serving as a crystalline oxide containing at least Ba and Si are used.

FIG. 2 shows that the crystal grains include BaTiO$_3$ crystal grains 11 serving as main crystal grains, and a Mg—Ni—Ti—O-based crystalline oxide grain 12 and a Ba—Si—O-based crystalline oxide grain 13 serving as secondary phases.

The method for producing a dielectric ceramic material with such a microstructure is not particularly limited. For example, the dielectric ceramic material can be produced by mixing an oxide powder serving as a main component and powders of the two crystalline oxides described above and firing the resulting mixture.

According to preferred embodiments of the present invention, the crystalline oxide containing at least Mg, Ni, and Ti preferably meets all the requirements of a Mg content of about 10 mol % or more, a Ni content of about 40 mol % or more, and a Ti content of about 5 mol % or more, the content excluding oxygen. Furthermore, the crystalline oxide containing at least Ba and Si preferably meets all the requirements of a Ba content of about 30 mol % or more and a Si content of about 30 mol % or more, the content excluding oxygen.

The Mg—Ni—Ti-containing crystalline grain and the Ba—Si-containing crystalline grain as the two types of secondary phase grains may contain other elements such as a rare-earth element as long as the foregoing requirements are met.

The dielectric ceramic material according to preferred embodiments of the present invention may further contain, as auxiliary components, R (wherein R includes at least one of La, Ce, Pr, Nd, Sm, Eu, Gd, Tb, Dy, Ho, Er, Tm, Yb, Lu, and Y), M (wherein M includes at least one of Mg, Ni, Mn, Co, Fe, Cr, Cu, Al, Mo, W, and V), and Si.

In this case, a total R content of about 0.1 to about 3.0 parts by mole and a total M content of about 0.2 to about 5.0 parts by mole with respect to about 100 parts by mole of the main component result in improved reliability under high-temperature loading conditions.

In the case where the main component ABO$_3$ contains about 78 to about 100 mol % Ba, about 0 to about 2 mol % Sr, about 0 to about 20 mol % Ca, about 96 to about 100 mol & Ti, about 0 to about 2 mol % Zr, and about 0 to about 2 mol % Hf, it is possible to obtain a composition having a high dielectric constant.

Experimental examples performed on the basis of the present invention will be described below.

Experimental Example 1

In Experimental Example 1, the effect of the presence or absence of the two types of secondary phase grains was investigated.

In Experimental Example 1, BaTiO$_3$ was used as ABO$_3$, a Mg—Ni—Ti—O-based crystalline oxide was used as a crystalline oxide containing at least Mg, Ni, and Ti, and a Ba—Si—O-based crystalline oxide was used as a crystalline oxide containing at least Ba and Si.

(A) Production of Dielectric Raw Material Mixture (A-1) Example 1-1

A BaCO$_3$ powder and a TiO$_2$ powder were prepared as raw materials. These powders were weighed so as to provide the composition of $BaTiO_3$ and then mixed in a ball mill. The resulting mixture was subjected to a heat treatment at about 1,150° C. to afford a $BaTiO_3$ powder having an average particle size of about 0.15 μm and a Ba/Ti ratio of about 1.001.

A $MgCO_3$ powder, a NiO powder, and a $TiO_2$ powder were weighed in a molar ratio of about 25:60:15 and then mixed in a ball mill. The resulting mixture was subjected to a heat treatment at about 1,000° C. to afford a Mg—Ni—Ti—O-based crystalline oxide powder. The resulting oxide was determined to be crystalline by XRD. The crystalline oxide powder had an average particle size of about 0.06 μm.

A $BaCO_3$ powder and a $SiO_2$ powder were weighed in a molar ratio of about 50:50 and then mixed in a ball mill. The resulting mixture was subjected to about 1,000° C. to afford a Ba—Si—O-based crystalline oxide powder. The resulting oxide was determined to be a crystalline oxide by XRD. The crystalline oxide powder had an average particle size of about 0.07 μm.

The $BaTiO_3$ powder, the Mg—Ni—Ti—O-based crystalline oxide powder, and the Ba—Si—O-based crystalline oxide powder were weighed in the weight ratios in "Example 1-1" shown in Table 1 and mixed in a ball mill, followed by drying to afford a dielectric raw-material mixture according to Example 1-1.

(A-2) Comparative Example 1-1

As shown in "Comparative Example 1-1" in Table 1, a dielectric raw-material mixture according to Comparative Example 1-1 was prepared as in Example 1-1, except that the $BaCO_3$ powder and the $SiO_2$ powder were added without being subjected to a heat treatment.

(A-3) Comparative Example 1-2

As shown in "Comparative Example 1-2" in Table 1, a dielectric raw-material mixture according to Comparative Example 1-2 was prepared as in Example 1-1, except that the $MgCO_3$ powder, the NiO powder, and the $TiO_2$ powder were added without being subjected to a heat treatment.

(A-4) Comparative Example 1-3

As shown in "Comparative Example 1-3" in Table 1, a dielectric raw-material mixture according to Comparative Example 1-2 was prepared as in Example 1-1, except that the $BaCO_3$ powder and the $SiO_2$ powder were added without being subjected to a heat treatment and that the $MgCO_3$ powder, the NiO powder, and the $TiO_2$ powder were added without being subjected to a heat treatment.

resulting mixtures was wet-mixed in a ball mill to form a ceramic slurry. The ceramic slurry was formed into ceramic green sheets by the doctor blade method. The resulting ceramic green sheets were cut so as to have a substantially rectangular shape.

A conductive paste mainly composed of Ni was applied to the ceramic green sheets by screen printing to form conductive paste films to be formed into internal electrodes.

The ceramic green sheets provided with the conductive paste films were stacked in such a manner that ends of the conductive paste films located at ends of the ceramic green sheets were alternately arranged, thereby providing a green laminate. The green laminate was heated to about 300° C. in a $N_2$ atmosphere to burn off the binder and then fired at about 1,150° C. for about 2 hours in a reducing atmosphere having an oxygen partial pressure of about $10^{-10}$ MPa and containing a mixed gas of $H_2$, $N_2$, and $H_2O$, thereby affording a sintered ceramic laminate.

A Cu paste containing a $B_2O_3$—$Li_2O$—$SiO_2$—BaO glass frit was applied to both ends of the ceramic laminate and baked at about 800° C. in a $N_2$ atmosphere to form external electrodes electrically connected to the internal electrodes. Thereby, monolithic ceramic capacitors according to the example and the comparative examples were produced.

The outer dimensions of each of the resulting monolithic ceramic capacitors were about 0.8 mm wide, about 1.6 mm long, and about 0.8 mm thick. Each of the dielectric ceramic layers arranged between the internal electrodes had a thickness of about 0.7 μm. The number of the effective dielectric ceramic layers was about 400. The overlapping area of the opposite electrodes was about 0.9 $mm^2$ per layer.

(C) Characteristic Evaluation and Analysis of Ceramic Microstructure

The dielectric constant was measured at about 25° C., about 1 kHz, and about 0.5 Vrms.

The rate of change of capacitance with respect to a change in temperature was measured at about 1 kHz and about 0.5 Vrms. The rates of change of capacitance at about −55° C., about 85° C., and about 125° C. were determined relative to capacitance at about 25° C.

Insulation resistance was measured after a DC voltage of about 6.3 V was applied at about 25° C. for about 180 seconds. The product of the capacitance and insulation resistance, i.e., CR product, was determined.

A high-temperature load life test was performed by applying a voltage of about 7 V at about 105° C. in such a manner that the field strength was about 10 kV/mm, thereby measuring the change in insulation resistance over time. In the high-

TABLE 1

| | Main component | Form of Mg, Ni and Ti added | Weight ratio (wt %) | Form of Ba and Si | Weight ratio (wt %) |
|---|---|---|---|---|---|
| Example 1-1 | $BaTiO_3$ | Mg—Ni—Ti—O crystalline oxide | 0.15 | Ba—Si—O crystalline oxide | 0.1 |
| Comparative Example 1-1 | $BaTiO_3$ | Mg—Ni—Ti—O crystalline oxide | 0.15 | Mixture of $BaCO_3$ and $SiO_2$ | 0.1 |
| Comparative Example 1-2 | $BaTiO_3$ | Mixture of $MgCO_3$, NiO, and $TiO_2$ | 0.15 | Ba—Si—O crystalline oxide | 0.1 |
| Comparative Example 1-3 | $BaTiO_3$ | Mixture of $MgCO_3$, NiO, and $TiO_2$ | 0.15 | Mixture of $BaCO_3$ and $SiO_2$ | 0.1 |

(B) Production of Monolithic Ceramic Capacitor

A polyvinyl butyral-based binder and ethanol were added to each of the dielectric raw-material mixtures. Each of the temperature load life test, about 100 samples were tested. A sample in which the insulation resistance was reduced to about 200 kΩ or less by about 1,000 hours was determined to be faulty.

About 50 samples of each example were subjected to a thermal shock test by immersing the samples in a solder tank set at about 275° C. or about 325° C. for about 3 minutes. The tested samples were embedded in a resin, polished, and inspected for cracks with a microscope. Samples having cracks were determined to be defective.

To elucidate the ceramic microstructure, the composition of any grain exposed at the section of each ceramic sample was analyzed by TEM-EDX. As a result, oxide grains containing at least Mg, Ni, and Ti and oxide grains containing at least Ba and Si, which were not $ABO_3$ grains, were identified. Whether these secondary phase grains were crystalline or not was investigated with an electron diffraction analyzer attached to the TEM.

(D) Result

Table 2 shows the results of the analysis of the ceramic microstructure. Table 3 shows the results of the characteristic evaluations.

TABLE 2

| | Crystalline grains present | | |
|---|---|---|---|
| Example 1-1 | $BaTiO_3$ | Mg—Ni—Ti—O crystalline oxide | Ba—Si—O crystalline oxide |
| Comparative Example 1-1 | $BaTiO_3$ | Mg—Ni—Ti—O crystalline oxide | — |
| Comparative Example 1-2 | $BaTiO_3$ | — | Ba—Si—O crystalline oxide |
| Comparative Example 1-3 | $BaTiO_3$ | — | — |

TABLE 3

| | Dielectric constant | Temperature coefficient (%) | | | CR product ($\Omega F$) | Number of defective samples in thermal shock test | | Number of faulty samples in high-temperature loading test |
|---|---|---|---|---|---|---|---|---|
| | | −55° C. | 85° C. | 125° C. | | 275° C. | 325° C. | |
| Example 1-1 | 3000 | −6.0 | −9.5 | −14.5 | 2450 | 0/50 | 0/50 | 0/100 |
| Comparative Example 1-1 | 3150 | −4.4 | −10.1 | −14.9 | 2500 | 1/50 | 5/50 | 0/100 |
| Comparative Example 1-2 | 3200 | −7.3 | −10.2 | −15.0 | 2450 | 1/50 | 10/50 | 0/100 |
| Comparative Example 1-3 | 2950 | −6.4 | −11.1 | −16.3 | 2200 | 3/50 | 19/50 | 0/100 |

Table 2 shows that only the samples in Example 1-1 had both of the Mg—Ni—Ti—O-based crystalline oxide grains and the Ba—Si—O-based crystalline oxide grains.

Table 3 shows that in the thermal shock test, only the samples in Example 1-1 having both of the Mg—Ni—Ti—O-based crystalline oxide grains and the Ba—Si—O-based crystalline oxide grains exhibited satisfactory results. That is, the samples in Example 1-1 did not fail at about 275° C., which is a commonly used temperature, and at about 325° C., which is about 50° C. higher than the commonly used temperature.

Experimental Example 2

In Experimental Example 2, the effect of changing the composition of the main component was studied. That is, in Experimental Example 2, components with compositions shown in Table 4 were used as $ABO_3$.

Furthermore, a Mg—Ni—Ti—Ba—Li—Mn—O-based crystalline oxide was used as the crystalline oxide containing at least Mg, Ni, and Ti, and a Ba—Si—Ni—Ti—O-based crystalline oxide was used as the crystalline oxide containing at least Ba and Si in Experimental Example 2.

(A) Production of Dielectric Raw-Material Mixture

A $BaCO_3$ powder, a $CaCO_3$ powder, a $SrCO_3$ powder, a $TiO_2$ powder, a $ZrO_2$ powder, and a $HfO_2$ powder were prepared as raw materials. These powders were weighed so as to form compositions described in the "Main component" section of Table 4 and then mixed in a ball mill. The resulting mixtures were subjected to heat treatment at about 1,100° C. to about 1,200° C. to afford $ABO_3$ powders having an average particle size of about 0.11 to about 0.17 μm.

Separately, a $MgCO_3$ powder, a NiO powder, a $TiO_2$ powder, a $BaCO_3$ powder, a $Li_2CO_3$ powder, and a $MnO_2$ powder were weighed in a molar ratio of about 13:55:13:2:161 and then mixed in a ball mill. The resulting mixture was subjected to heat treatment at about 1,000° C. to afford a Mg—Ni—Ti—Ba—Li—Mn—O-based crystalline oxide powder. The resulting oxide was determined to be crystalline by XRD. The crystalline oxide powder had an average particle size of about 0.05 μm.

A $BaCO_3$ powder, a $SiO_2$ powder, a NiO powder, and a $TiO_2$ powder were weighed in a molar ratio of about 40:40:10:10 and then mixed in a ball mill. The resulting mixture was subjected to about 1,000° C. to afford a Ba—Si—Ni—Ti—O-based crystalline oxide powder. The resulting oxide was determined to be a crystalline oxide by XRD. The crystalline oxide powder had an average particle size of about 0.06 μm.

The $ABO_3$ powders, the Mg—Ni—Ti—Ba—Li—Mn—O-based crystalline oxide powder, the Ba—Si—Ni—Ti—O-based crystalline oxide powder, and $SiO_2$ serving as a sintering agent were weighed so as to provide compositions shown in Table 4 and then mixed in a ball mill, followed by drying to afford dielectric raw-material mixtures according to Examples 2-1 to 2-6.

TABLE 4

| | Main component | | SiO$_2$ | Sum of main component |
|---|---|---|---|---|
| | Composition | Composition ratio (part by mole) | Composition ratio (part by mole) | and SiO$_2$ Weight ratio (wt %) |
| Example 2-1 | BaTiO$_3$ | 100 | 2 | 99.8 |
| Example 2-2 | (Ba$_{0.98}$Sr$_{0.02}$)(Ti$_{0.99}$Hf$_{0.01}$)O$_3$ | " | " | " |
| Example 2-3 | (Ba$_{0.8}$Ca$_{0.2}$)(Ti$_{0.99}$Zr$_{0.01}$)O$_3$ | " | " | " |
| Example 2-4 | (Ba$_{0.95}$Ca$_{0.05}$)(Ti$_{0.98}$Zr$_{0.02}$)O$_3$ | " | " | " |
| Example 2-5 | (Ba$_{0.98}$Ca$_{0.02}$)(Ti$_{0.98}$Hf$_{0.02}$)O$_3$ | " | " | " |
| Example 2-6 | (Ba$_{0.98}$Sr$_{0.01}$Ca$_{0.01}$)(Ti$_{0.99}$Zr$_{0.005}$Hf$_{0.005}$)O$_3$ | " | " | " |

| | Added component | | | |
|---|---|---|---|---|
| | Composition | Weight ratio (wt %) | Composition | Weight ratio (wt %) |
| Example 2-1 | Mg—Ni—Ti—Ba—Li—Mn—O crystalline oxide | 0.1 | Ba—Si—Ni—Ti—O crystalline oxide | 0.1 |
| Example 2-2 | Mg—Ni—Ti—Ba—Li—Mn—O crystalline oxide | " | Ba—Si—Ni—Ti—O crystalline oxide | 0.1 |
| Example 2-3 | Mg—Ni—Ti—Ba—Li—Mn—O crystalline oxide | " | Ba—Si—Ni—Ti—O crystalline oxide | 0.1 |
| Example 2-4 | Mg—Ni—Ti—Ba—Li—Mn—O crystalline oxide | " | Ba—Si—Ni—Ti—O crystalline oxide | 0.1 |
| Example 2-5 | Mg—Ni—Ti—Ba—Li—Mn—O crystalline oxide | " | Ba—Si—Ni—Ti—O crystalline oxide | 0.1 |
| Example 2-6 | Mg—Ni—Ti—Ba—Li—Mn—O crystalline oxide | " | Ba—Si—Ni—Ti—O crystalline oxide | 0.1 |

As shown in Table 4, about 2 parts by mole of SiO$_2$ was added relative to about 100 parts by mole of each main component. The sum of each main component and SiO$_2$ was set to about 99.8% by weight. With respect to the remaining about 0.2% by weight, about 0.1% by weight of the Mg—Ni—Ti—Ba—Li—Mn—O-based crystalline oxide powder and about 0.1% by weight of the Ba—Si—Ni—Ti—O-based crystalline oxide powder were added.

(B) Production of Monolithic Ceramic Capacitor

Monolithic ceramic capacitors according to these examples were produced as in Experimental Example 1. The monolithic ceramic capacitors had the same specification as in Experimental Example 1.

(C) Characteristic Evaluation and Analysis of Ceramic Microstructure

Characteristic evaluation and the analysis of the ceramic microstructure were performed as in Experimental Example 1.

(D) Result

Table 5 shows the results of the analysis of the ceramic microstructure. Table 6 shows the results of the characteristic evaluation.

TABLE 5

| | | Crystalline grains present | |
|---|---|---|---|
| Example 2-1 | BaTiO$_3$ | Mg—Ni—Ti—Ba—Li—Mn—O crystalline oxide | Ba—Si—Ni—Ti—O crystalline oxide |
| Example 2-2 | (Ba$_{0.98}$Sr$_{0.02}$)(Ti$_{0.99}$Hf$_{0.01}$)O$_3$ | Mg—Ni—Ti—Ba—Li—Mn—O crystalline oxide | Ba—Si—Ni—Ti—O crystalline oxide |
| Example 2-3 | (Ba$_{0.8}$Ca$_{0.2}$)(Ti$_{0.99}$Zr$_{0.01}$)O$_3$ | Mg—Ni—Ti—Ba—Li—Mn—O crystalline oxide | Ba—Si—Ni—Ti—O crystalline oxide |
| Example 2-4 | (Ba$_{0.95}$Ca$_{0.05}$)(Ti$_{0.98}$Zr$_{0.02}$)O$_3$ | Mg—Ni—Ti—Ba—Li—Mn—O crystalline oxide | Ba—Si—Ni—Ti—O crystalline oxide |

TABLE 5-continued

| | | Crystalline grains present | |
|---|---|---|---|
| Example 2-5 | $(Ba_{0.98}Ca_{0.02})(Ti_{0.98}Hf_{0.02})O_3$ | Mg—Ni—Ti—Ba—Li—Mn—O crystalline oxide | Ba—Si—Ni—Ti—O crystalline oxide |
| Example 2-6 | $(Ba_{0.98}Sr_{0.01}Ca_{0.01})(Ti_{0.99}Zr_{0.005}Hf_{0.005})O_3$ | Mg—Ni—Ti—Ba—Li—Mn—O crystalline oxide | Ba—Si—Ni—Ti—O crystalline oxide |

TABLE 6

| | Dielectric constant | Temperature coefficient (%) | | | CR product (ΩF) | Number of defective samples in thermal shock test | | Number of faulty samples in high-temperature loading test |
|---|---|---|---|---|---|---|---|---|
| | | −55° C. | 85° C. | 125° C. | | 275° C. | 325° C. | |
| Example 2-1 | 3100 | −6.4 | −9.6 | −14.0 | 2350 | 0/50 | 0/50 | 0/100 |
| Example 2-2 | 2050 | −5.5 | −11.3 | −15.5 | 2400 | 0/50 | 0/50 | 0/100 |
| Example 2-3 | 2800 | −4.6 | −11.2 | −14.5 | 2100 | 0/50 | 0/50 | 0/100 |
| Example 2-4 | 2750 | −6.0 | −12.1 | −15.2 | 2150 | 0/50 | 0/50 | 0/100 |
| Example 2-5 | 2900 | −4.4 | −12.3 | −15.3 | 2200 | 0/50 | 0/50 | 0/100 |
| Example 2-6 | 3050 | −7.3 | −11.7 | −15.1 | 2200 | 0/50 | 0/50 | 0/100 |

Table 5 shows that each of the samples according to Examples 2-1 to 2-6 had both of the crystalline oxide grains containing Mg, Ni, and Ti and the crystalline oxide grains containing Ba and Si.

Table 6 shows that in the thermal shock test, all samples according to Examples 2-1 to 2-6 exhibited satisfactory results.

Experimental Example 3

In Experimental Example 3, the effect of changing the type and amount of the auxiliary components was studied.

$(Ba_{0.95}Ca_{0.05})(Ti_{0.995}Zr_{0.005})O_3$ was used as $ABO_3$ in Experimental Example 3. A Mg—Ni—Ti—O-based crystalline oxide was used as the crystalline oxide containing at least Mg, Ni, and Ti. A Ba—Ti—Ni—Si—Li—O-based crystalline oxide was used as the crystalline oxide containing at least Ba and Si. Furthermore, R (rare-earth element) and M (at least one of Mn, Ni, Co, Fe, Cr, Cu, Mg, Al, Mo, W, and V) were added as auxiliary components in addition to Si.

(A) Production of Dielectric Raw-Material Mixture

A $BaCO_3$ powder, a $CaCO_3$ powder, a $TiO_2$ powder, and a $ZrO_2$ powder were prepared as raw materials. These powders were weighed so as to provide the composition of $(Ba_{0.95}Ca_{0.05})(Ti_{0.995}Zr_{0.005})O_3$ and then mixed in a ball mill. The resulting mixture was subjected to heat treatment at about 1,150° C. to afford a $(Ba_{0.95}Ca_{0.05})(Ti_{0.995}Zr_{0.05})O_3$ powder having an average particle size of about 0.16 μm.

Separately, a $MgCO_3$ powder, a NiO powder, a $TiO_2$ powder were weighed in a molar ratio of about 25:60:15 and then mixed in a ball mill. The resulting mixture was subjected to heat treatment at about 1,000° C. to afford a Mg—Ni—Ti—O-based crystalline oxide powder. The resulting oxide was determined to be crystalline by XRD. The crystalline oxide powder had an average particle size of about 0.06 μm.

A $BaCO_3$ powder, a $SiO_2$ powder, a NiO powder, a $TiO_2$ powder, and a $Li_2CO_3$ powder were weighed in a molar ratio of about 36:36:10:9:9 and then mixed in a ball mill. The resulting mixture was subjected to about 1,000° C. to afford a Ba—Si—Ni—Ti—Li—O-based crystalline oxide powder. The resulting oxide was determined to be a crystalline oxide by XRD. The crystalline oxide powder had an average particle size of about 0.06 μm.

The $(Ba_{0.95}Ca_{0.05})(Ti_{0.995}Zr_{0.005})O_3$ powder, the Mg—Ni—Ti—β-based crystalline oxide powder, the Ba—Si—Ni—Ti—Li—O-based crystalline oxide powder, a $SiO_2$ powder, an R oxide powder, and an M oxide powder were weighed so as to provide compositions shown in Tables 7 and 8 and then mixed with a ball mill, followed by drying to afford dielectric raw-material mixtures according to Examples 3-1 to 3-19.

TABLE 7

| | Main component | | Added component (R) | | Added component (M) | | $SiO_2$ | |
|---|---|---|---|---|---|---|---|---|
| | Composition | Composition ratio (part by mole) | Breakdown of R | Composition ratio (part by mole) | Breakdown of M | | Composition ratio (part by mole) | Composition ratio (part by mole) | Sum Weight ratio (wt %) |
| Example 3-1 | $(Ba_{0.95}Ca_{0.05})(Ti_{0.995}Zr_{0.005})O_3$ | 100 | | 0.0 | Cr 0.2  Mg 2.0  Cu 0.3 | | 2.50 | 2 | 99.7 |
| Example 3-2 | $(Ba_{0.95}Ca_{0.05})(Ti_{0.995}Zr_{0.005})O_3$ | 100 | Dy 0.1 | 0.1 | Mn 0.3  Ni 1.0  Cu 1.0 | | 2.30 | 2 | 99.7 |

TABLE 7-continued

|  | Main component | | Added component (R) | | | Added component (M) | | | | | | | | | SiO$_2$ | |
|---|---|---|---|---|---|---|---|---|---|---|---|---|---|---|---|---|
|  | Composition | Composition ratio (part by mole) | Breakdown of R | | Composition ratio (part by mole) | Breakdown of M | | | | | | | | | Composition ratio (part by mole) | Composition ratio (part by mole) | Sum Weight ratio (wt %) |
| Example 3-3 | (Ba$_{0.95}$Ca$_{0.05}$)(Ti$_{0.995}$Zr$_{0.005}$)O$_3$ | 100 | Pr 0.5 | Dy 0.7 | 1.2 | Ni 2.0 | V 0.3 | | | | | | | 2.30 | 2 | 99.7 |
| Example 3-4 | (Ba$_{0.95}$Ca$_{0.05}$)(Ti$_{0.995}$Zr$_{0.005}$)O$_3$ | 100 | Nd 0.5 | Ho 2.5 | 3.0 | Co 1.0 | V 0.3 | Li 1.0 | Mo 0.2 | | | | | 2.50 | 2 | 99.7 |
| Example 3-5 | (Ba$_{0.95}$Ca$_{0.05}$)(Ti$_{0.995}$Zr$_{0.005}$)O$_3$ | 100 | Dy 3.4 | | 3.4 | W 0.3 | Mg 1.5 | | | | | | | 1.80 | 2 | 99.7 |
| Example 3-6 | (Ba$_{0.95}$Ca$_{0.05}$)(Ti$_{0.995}$Zr$_{0.005}$)O$_3$ | 100 | Y 1.0 | Er 1.0 | 2.0 | | | | | | | | | 0.00 | 2 | 99.7 |
| Example 3-7 | (Ba$_{0.95}$Ca$_{0.05}$)(Ti$_{0.995}$Zr$_{0.005}$)O$_3$ | 100 | Yb 0.5 | Dy 1.5 | 2.0 | Mn 0.1 | Li 0.1 | | | | | | | 0.20 | 2 | 99.7 |
| Example 3-8 | (Ba$_{0.95}$Ca$_{0.05}$)(Ti$_{0.995}$Zr$_{0.005}$)O$_3$ | 100 | Ho 2.2 | | 2.2 | Li 0.5 | Ni 0.5 | Co 0.3 | | | | | | 1.30 | 2 | 99.7 |
| Example 3-9 | (Ba$_{0.95}$Ca$_{0.05}$)(Ti$_{0.995}$Zr$_{0.005}$)O$_3$ | 100 | Er 0.8 | Y 1.2 | 2.0 | V 0.1 | Fe 0.1 | Al 0.1 | Mg 2.0 | | | | | 2.30 | 2 | 99.7 |
| Example 3-10 | (Ba$_{0.95}$Ca$_{0.05}$)(Ti$_{0.995}$Zr$_{0.005}$)O$_3$ | 100 | Dy 0.6 | Yb 0.6 | 1.2 | Ni 1.0 | Mo 0.5 | | | | | | | 1.50 | 2 | 99.7 |
| Example 3-11 | (Ba$_{0.95}$Ca$_{0.05}$)(Ti$_{0.995}$Zr$_{0.005}$)O$_3$ | 100 | Ce 0.4 | Ho 1.0 Lu 0.5 | 1.9 | Mn 0.2 | Mg 4.8 | | | | | | | 5.00 | 2 | 99.7 |
| Example 3-12 | (Ba$_{0.95}$Ca$_{0.05}$)(Ti$_{0.995}$Zr$_{0.005}$)O$_3$ | 100 | Sm 0.2 | Y 1.0 | 1.2 | V 0.1 | Mo 0.1 | Mg 6.0 | | | | | | 6.20 | 2 | 99.7 |
| Example 3-13 | (Ba$_{0.95}$Ca$_{0.05}$)(Ti$_{0.995}$Zr$_{0.005}$)O$_3$ | 100 | Eu 0.3 | Dy 1.5 | 1.8 | Mn 0.3 | Mg 2.0 | | | | | | | 2.30 | 2 | 99.7 |
| Example 3-14 | (Ba$_{0.95}$Ca$_{0.05}$)(Ti$_{0.995}$Zr$_{0.005}$)O$_3$ | 100 | Gd 1.0 | Y 1.0 | 2.0 | Co 1.8 | V 0.3 | | | | | | | 2.10 | 2 | 99.7 |
| Example 3-15 | (Ba$_{0.95}$Ca$_{0.05}$)(Ti$_{0.995}$Zr$_{0.005}$)O$_3$ | 100 | Y 1.8 | | 1.8 | Li 1.0 | Cu 0.3 | | | | | | | 1.30 | 2 | 99.7 |
| Example 3-16 | (Ba$_{0.95}$Ca$_{0.05}$)(Ti$_{0.995}$Zr$_{0.005}$)O$_3$ | 100 | La 0.5 | Tb 0.3 Ho 1 | 1.8 | W 0.3 | Al 1.5 | | | | | | | 1.80 | 2 | 99.7 |
| Example 3-17 | (Ba$_{0.95}$Ca$_{0.05}$)(Ti$_{0.995}$Zr$_{0.005}$)O$_3$ | 100 | Tm 0.4 | Dy 1.3 | 1.7 | Mn 0.2 | V 0.2 | Mg 2.0 | | | | | | 2.40 | 2 | 99.7 |
| Example 3-18 | (Ba$_{0.95}$Ca$_{0.05}$)(Ti$_{0.995}$Zr$_{0.005}$)O$_3$ | 100 | Lu 1.0 | Dy 1.0 | 2.0 | Mn 0.3 | Al 1.0 | Mg 1.0 | Mo 0.1 | | | | | 2.40 | 2 | 99.7 |
| Example 3-19 | (Ba$_{0.95}$Ca$_{0.05}$)(Ti$_{0.995}$Zr$_{0.005}$)O$_3$ | 100 | Dy 1.8 | | 1.8 | Mn 0.1 | Li 1.0 | Mg 1.0 | | | | | | 2.10 | 2 | 99.7 |

TABLE 8

|  | Added component | | | |
|---|---|---|---|---|
|  | Composition | Weight ratio (wt %) | Composition | Weight ratio (wt %) |
| Example 3-1 | Mg—Ni—Ti—O-based crystalline oxide | 0.1 | Ba—Si—Ni—Ti—O-based crystalline oxide | 0.2 |
| Example 3-2 | Mg—Ni—Ti—O-based crystalline oxide | 0.1 | Ba—Si—Ni—Ti—O-based crystalline oxide | 0.2 |
| Example 3-3 | Mg—Ni—Ti—O-based crystalline oxide | 0.1 | Ba—Si—Ni—Ti—O-based crystalline oxide | 0.2 |
| Example 3-4 | Mg—Ni—Ti—O-based crystalline oxide | 0.1 | Ba—Si—Ni—Ti—O-based crystalline oxide | 0.2 |
| Example 3-5 | Mg—Ni—Ti—O-based crystalline oxide | 0.1 | Ba—Si—Ni—Ti—O-based crystalline oxide | 0.2 |
| Example 3-6 | Mg—Ni—Ti—O-based crystalline oxide | 0.1 | Ba—Si—Ni—Ti—O-based crystalline oxide | 0.2 |
| Example 3-7 | Mg—Ni—Ti—O-based crystalline oxide | 0.1 | Ba—Si—Ni—Ti—O-based crystalline oxide | 0.2 |
| Example 3-8 | Mg—Ni—Ti—O-based crystalline oxide | 0.1 | Ba—Si—Ni—Ti—O-based crystalline oxide | 0.2 |
| Example 3-9 | Mg—Ni—Ti—O-based crystalline oxide | 0.1 | Ba—Si—Ni—Ti—O-based crystalline oxide | 0.2 |

TABLE 8-continued

|  | Added component | | | |
|---|---|---|---|---|
|  | Composition | Weight ratio (wt %) | Composition | Weight ratio (wt %) |
| Example 3-10 | Mg—Ni—Ti—O-based crystalline oxide | 0.1 | Ba—Si—Ni—Ti—O-based crystalline oxide | 0.2 |
| Example 3-11 | Mg—Ni—Ti—O-based crystalline oxide | 0.1 | Ba—Si—Ni—Ti—O-based crystalline oxide | 0.2 |
| Example 3-12 | Mg—Ni—Ti—O-based crystalline oxide | 0.1 | Ba—Si—Ni—Ti—O-based crystalline oxide | 0.2 |
| Example 3-13 | Mg—Ni—Ti—O-based crystalline oxide | 0.1 | Ba—Si—Ni—Ti—O-based crystalline oxide | 0.2 |
| Example 3-14 | Mg—Ni—Ti—O-based crystalline oxide | 0.1 | Ba—Si—Ni—Ti—O-based crystalline oxide | 0.2 |
| Example 3-15 | Mg—Ni—Ti—O-based crystalline oxide | 0.1 | Ba—Si—Ni—Ti—O-based crystalline oxide | 0.2 |
| Example 3-16 | Mg—Ni—Ti—O-based crystalline oxide | 0.1 | Ba—Si—Ni—Ti—O-based crystalline oxide | 0.2 |
| Example 3-17 | Mg—Ni—Ti—O-based crystalline oxide | 0.1 | Ba—Si—Ni—Ti—O-based crystalline oxide | 0.2 |
| Example 3-18 | Mg—Ni—Ti—O-based crystalline oxide | 0.1 | Ba—Si—Ni—Ti—O-based crystalline oxide | 0.2 |
| Example 3-19 | Mg—Ni—Ti—O-based crystalline oxide | 0.1 | Ba—Si—Ni—Ti—O-based crystalline oxide | 0.2 |

Tables 7 and 8 show the compositions of the dielectric raw-material mixtures according to Examples 3-1 to 3-19. Table 7 shows the amounts of R, M, and Si added relative to about 100 parts by mole of the main component, the amounts being given in units of part by mole. The sum of the amounts of the main component, R, M, and Si accounts for about 99.7% by weight of each dielectric raw-material mixture. Table 8 shows that the Mg—Ni—Ti—O-based crystalline oxide powder and the Ba—Si—Ni—Ti—Li—O-based crystalline oxide powder account for the remaining about 0.3% by weight of each dielectric raw-material mixture.

(B) Production of Monolithic Ceramic Capacitor

Monolithic ceramic capacitors according to these examples were produced as in Experimental Example 1. The monolithic ceramic capacitors had the same specification as in Experimental Example 1.

(C) Characteristic Evaluation and Analysis of Ceramic Microstructure

Characteristic evaluation and the analysis of the ceramic microstructure were performed as in Experimental Example 1.

Note that the high-temperature load life test was performed by about 2,000 hours as well as by about 1,000 hours.

(D) Result

Table 9 shows the results of the analysis of the ceramic microstructure. Table 10 shows the results of the characteristic evaluation.

TABLE 9

|  | Crystalline grains present | | |
|---|---|---|---|
| Example 3-1 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-2 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-3 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-4 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-5 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-6 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-7 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-8 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-9 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |

TABLE 9-continued

| | Crystalline grains present | | |
|---|---|---|---|
| Example 3-10 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-11 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-12 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-13 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-14 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-15 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-16 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-17 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-18 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |
| Example 3-19 | $(Ba_{0.95}Ca_{0.05})(Ti_{0.995}Zr_{0.005})O_3$ | Mg—Ni—Ti—O-based crystalline oxide | Ba—Si—Ni—Ti—Li—O-based crystalline oxide |

TABLE 10

| | Dielectric constant | Temperature coefficient (%) | | | CR product ($\Omega F$) | Number of defective samples in thermal shock test | | Number of faulty samples in high-temperature loading test | |
|---|---|---|---|---|---|---|---|---|---|
| | | −55° C. | 85° C. | 125° C. | | 275° C. | 325° C. | 1000 h | 2000 h |
| Example 3-1 | 2950 | −5.8 | −9.7 | −14.4 | 2550 | 0/50 | 0/50 | 0/100 | 3/100 |
| Example 3-2 | 2600 | −6.6 | −12.6 | −14.3 | 2900 | 0/50 | 0/50 | 0/100 | 0/100 |
| Example 3-3 | 2400 | −5.5 | −11.6 | −13.5 | 2900 | 0/50 | 0/50 | 0/100 | 0/100 |
| Example 3-4 | 2200 | −2.4 | −10.4 | −12.3 | 2900 | 0/50 | 0/50 | 0/100 | 0/100 |
| Example 3-5 | 1300 | −2.4 | −8.9 | −10.4 | 2600 | 0/50 | 0/50 | 0/100 | 0/100 |
| Example 3-6 | 3100 | −4.9 | −9.2 | −14.6 | 2500 | 0/50 | 0/50 | 0/100 | 5/100 |
| Example 3-7 | 2550 | −4.6 | −12.2 | −13.2 | 3400 | 0/50 | 0/50 | 0/100 | 0/100 |
| Example 3-8 | 2500 | −4.2 | −11.6 | −12.9 | 3100 | 0/50 | 0/50 | 0/100 | 0/100 |
| Example 3-9 | 2300 | −3.6 | −11.3 | −12.2 | 2900 | 0/50 | 0/50 | 0/100 | 0/100 |
| Example 3-10 | 2250 | −1.6 | −10.0 | −11.6 | 2750 | 0/50 | 0/50 | 0/100 | 0/100 |
| Example 3-11 | 2100 | −1.8 | −9.6 | −11.7 | 2600 | 0/50 | 0/50 | 0/100 | 0/100 |
| Example 3-12 | 1350 | −1.6 | −8.5 | −10.9 | 2450 | 0/50 | 0/50 | 0/100 | 0/100 |
| Example 3-13 | 2400 | −4.4 | −11.8 | −12.3 | 2900 | 0/50 | 0/50 | 0/100 | 0/100 |
| Example 3-14 | 2300 | −3.9 | −10.4 | −11.7 | 2900 | 0/50 | 0/50 | 0/100 | 0/100 |
| Example 3-15 | 2400 | −3.4 | −11.6 | −12.7 | 2900 | 0/50 | 0/50 | 0/100 | 0/100 |
| Example 3-16 | 2300 | −2.9 | −11.9 | −13.0 | 2950 | 0/50 | 0/50 | 0/100 | 0/100 |
| Example 3-17 | 2350 | −2.5 | −12.3 | −13.6 | 2900 | 0/50 | 0/50 | 0/100 | 0/100 |
| Example 3-18 | 2300 | −3.6 | −11.5 | −12.3 | 2900 | 0/50 | 0/50 | 0/100 | 0/100 |
| Example 3-19 | 2400 | −3.9 | −11.2 | −11.7 | 2850 | 0/50 | 0/50 | 0/100 | 0/100 |

Table 9 shows that each of the samples according to Examples 3-1 to 3-19 had both of the crystalline oxide grains containing Mg, Ni, and Ti and the crystalline oxide grains containing Ba and Si.

Table 10 shows that in the thermal shock test, all samples according to Examples 3-1 to 3-19 exhibited satisfactory results.

As shown in Table 10, the results of the high-temperature load life test demonstrated the following: The samples according to Examples 3-1 to 3-19 did not fail after about 1,000 hours and exhibited excellent reliability, as in Examples 1-1 and 2-1 to 2-6. In Experimental Example 3, the samples in Examples 3-2 to 3-5 and 3-7 to 3-19 in which the proportions of R were in the range of about 0.1 to about 3 mol and the proportions of M were in the range of about 0.2 to about 5 mol, on an elemental basis, relative to about 100 mol of $ABO_3$ did not fail after about 2,000 hours and exhibited particularly excellent reliability.

In the foregoing experimental examples, the powders composed of the crystalline oxides were synthesized and then added to the $ABO_3$ powder in order to form the Mg—Ni—Ti-containing crystalline oxide grains and the Ba—Si-containing crystalline grains. However, the present invention is not limited to this method. For example, the foregoing crystalline grains may be formed from part of a diffused component of the internal electrodes and/or a diffused ceramic component contained in the internal electrodes.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A dielectric ceramic material comprising:
   crystal grains and grain boundaries; and
   a perovskite compound represented by $ABO_3$ in which A comprises Ba or Ba and at least one of Sr and Ca, and B comprises Ti or Ti and at least one of Zr and Hf, main component, and the dielectric ceramic material comprising crystal grains and grain boundaries in which
   the crystal grains comprise the main component and, as secondary phases, a Mg—Ni—Ti-containing crystalline grain comprising a crystalline oxide comprising Mg, Ni, and Ti, and a Ba—Si-containing crystalline grain comprising a crystalline oxide comprising Ba and Si.

2. The dielectric ceramic material according to claim 1, further comprising, as auxiliary components, at least one of:
   R which is at least one of La, Ce, Pr, Nd, Sm, Eu, Gd, Tb, Dy, Ho, Er, Tm, Yb, Lu, and Y;
   M which is at least one of Mg, Ni, Mn, Co, Fe, Cr, Cu, Al, Mo, W, and V; and
   Si.

3. The dielectric ceramic material according to claim 2, wherein the total R content is in the range of about 0.1 to about 3.0 parts by mole with respect to about 100 parts by mole of the main component, and
   the total M content is in the range of about 0.2 to about 5.0 parts by mole with respect to about 100 parts by mole of the main component.

4. The dielectric ceramic material according to claim 3, wherein A of the main component $ABO_3$ has a Ba content of about 78 to about 100 mol %, a Sr content of about 0 to about 2 mol %, and a Ca content of about 0 to about 20 mol %, and the B of the main component has a Ti content of about 96 to about 100 mol %, a Zr content of about 0 to about 2 mol %, and a Hf content of about 0 to about 2 mol %.

5. The dielectric ceramic material according to claim 4, wherein the crystalline oxide comprising Mg, Ni, and Ti has a content, excluding oxygen, of at least about 10 mol % Mg, at least about 40 mol % Ni, and at least about 5 ml % Ti.

6. The dielectric ceramic material according to claim 2, wherein A of the main component $ABO_3$ has a Ba content of about 78 to about 100 mol %, a Sr content of about 0 to about 2 mol %, and a Ca content of about 0 to about 20 mol %, and the B of the main component has a Ti content of about 96 to about 100 mol %, a Zr content of about 0 to about 2 mol %, and a Hf content of about 0 to about 2 mol %.

7. The dielectric ceramic material according to claim 6, wherein the crystalline oxide comprising Mg, Ni, and Ti has a content, excluding oxygen, of at least about 10 mol % Mg, at least about 40 mol % Ni, and at least about 5 ml % Ti.

8. The dielectric ceramic material according to claim 1, wherein A of the main component $ABO_3$ has a Ba content of about 78 to about 100 mol %, a Sr content of about 0 to about 2 mol %, and a Ca content of about 0 to about 20 mol %, and the B of the main component has a Ti content of about 96 to about 100 mol %, a Zr content of about 0 to about 2 mol %, and a Hf content of about 0 to about 2 mol %.

9. The dielectric ceramic material according to claim 8, wherein the crystalline oxide comprising Mg, Ni, and Ti has a content, excluding oxygen, of at least about 10 mol % Mg, at least about 40 mol % Ni, and at least about 5 ml % Ti.

10. The dielectric ceramic material according to claim 1, wherein the crystalline oxide comprising Mg, Ni, and Ti has a content, excluding oxygen, of at least about 10 mol % Mg, at least about 40 mol % Ni, and at least about 5 ml % Ti.

11. A monolithic ceramic capacitor comprising:
    a capacitor main body comprising
       a plurality of stacked dielectric ceramic layers;
       a plurality of first and second internal electrodes wherein each of the first and second internal electrodes are disposed at different interfaces between adjacent dielectric ceramic layers; and
    a first external electrode and a second external electrode disposed on different portions of outer surfaces of the capacitor main body,
    wherein the first internal electrodes are electrically connected to the first external electrode,
    the second internal electrodes are electrically connected to the second external electrode, and
    the first internal electrodes and the second internal electrodes are alternately arranged in the stacking direction, and
    wherein the dielectric ceramic layers are composed of the dielectric ceramic material according to claim 1.

12. The monolithic ceramic capacitor according to claim 11, wherein the first and second internal electrodes comprise Ni.

13. A monolithic ceramic capacitor comprising:
    a capacitor main body comprising
       a plurality of stacked dielectric ceramic layers;
       a plurality of first and second internal electrodes wherein each of the first and second internal electrodes are disposed at different interfaces between adjacent dielectric ceramic layers; and
    a first external electrode and a second external electrode disposed on different portions of outer surfaces of the capacitor main body, wherein the first internal electrodes are electrically connected to the first external electrode, the second internal electrodes are electrically connected to the second external electrode, and the first internal electrodes and the second internal electrodes are alternately arranged in the stacking direction, and wherein the dielectric ceramic layers are composed of the dielectric ceramic material according to claim 2.

14. The monolithic ceramic capacitor according to claim 13, wherein the first and second internal electrodes comprise Ni.

15. A monolithic ceramic capacitor comprising:

a capacitor main body comprising a plurality of stacked dielectric ceramic layers;

a plurality of first and second internal electrodes wherein each of the first and second internal electrodes are disposed at different interfaces between adjacent dielectric ceramic layers; and a first external electrode and a second external electrode disposed on different portions of outer surfaces of the capacitor main body, wherein the first internal electrodes are electrically connected to the first external electrode, the second internal electrodes are electrically connected to the second external electrode, and the first internal electrodes and the second internal electrodes are alternately arranged in the stacking direction, and wherein the dielectric ceramic layers are composed of the dielectric ceramic material according to claim 3.

16. The monolithic ceramic capacitor according to claim 15, wherein the first and second internal electrodes comprise Ni.

17. A monolithic ceramic capacitor comprising:

a capacitor main body comprising a plurality of stacked dielectric ceramic layers;

a plurality of first and second internal electrodes wherein each of the first and second internal electrodes are disposed at different interfaces between adjacent dielectric ceramic layers; and a first external electrode and a second external electrode disposed on different portions of outer surfaces of the capacitor main body, wherein the first internal electrodes are electrically connected to the first external electrode, the second internal electrodes are electrically connected to the second external electrode, and the first internal electrodes and the second internal electrodes are alternately arranged in the stacking direction, and wherein the dielectric ceramic layers are composed of the dielectric ceramic material according to claim 1.

18. The monolithic ceramic capacitor according to claim 17, wherein the first and second internal electrodes comprise Ni.

19. A monolithic ceramic capacitor comprising:

a capacitor main body comprising a plurality of stacked dielectric ceramic layers;

a plurality of first and second internal electrodes wherein each of the first and second internal electrodes are disposed at different interfaces between adjacent dielectric ceramic layers; and a first external electrode and a second external electrode disposed on different portions of outer surfaces of the capacitor main body, wherein the first internal electrodes are electrically connected to the first external electrode, the second internal electrodes are electrically connected to the second external electrode, and the first internal electrodes and the second internal electrodes are alternately arranged in the stacking direction, and wherein the dielectric ceramic layers are composed of the dielectric ceramic material according to claim 5.

20. The monolithic ceramic capacitor according to claim 19, wherein the first and second internal electrodes comprise Ni.

* * * * *